Sept. 24, 1940. A. O. G. PALMGREN 2,215,741
CONNECTING ROD
Filed March 27, 1940 2 Sheets-Sheet 1

INVENTOR
Allan Otto Georg Palmgren
BY Chas. Lyn Russell
HIS ATTORNEY

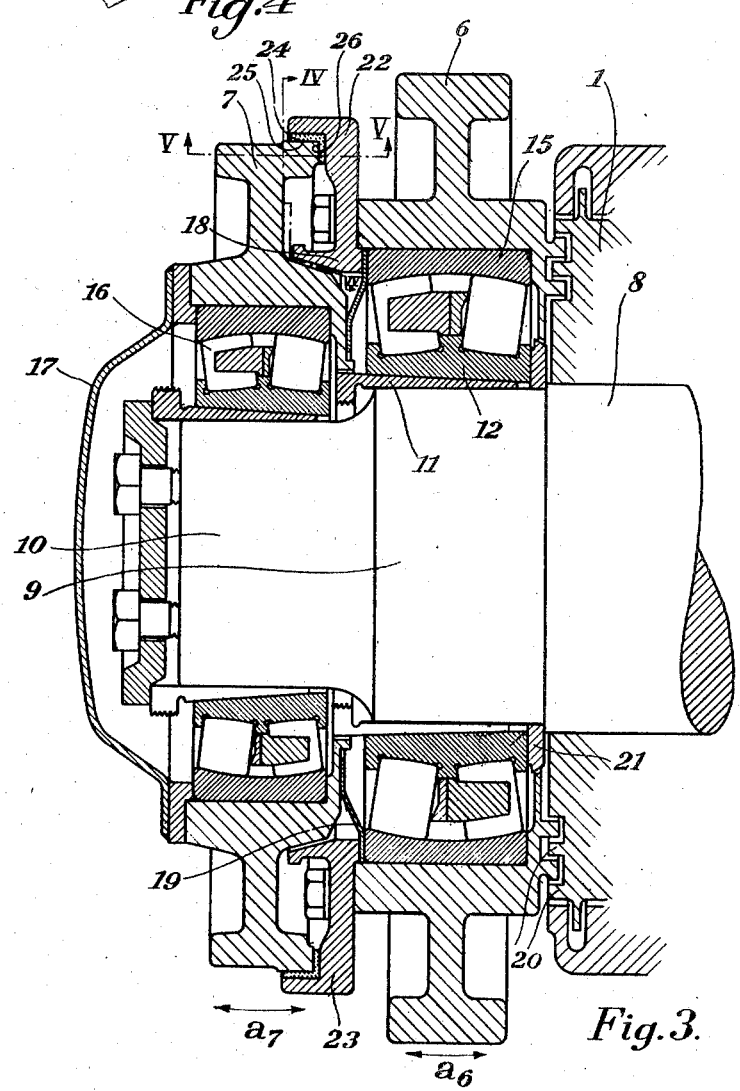

Patented Sept. 24, 1940

2,215,741

UNITED STATES PATENT OFFICE 2,215,741

CONNECTING ROD

Allan Otto Georg Palmgren, Goteborg, Sweden, assignor to Aktiebolaget Svenska Kullagerfabriken, Goteborg, Sweden Application March 27, 1940, Serial No. 326,182
In Sweden April 8, 1939

9 Claims. (Cl. 74—580)

Self-aligning ball or roller bearings are now frequently used for mounting connecting rods on crank-or drivepins. In locomotives these bearings afford among other things the advantage that the connecting rods can turn relative to the journal pins about axes which are perpendicular to the axes of the pins as well as to the longitudinal axes of the connecting rods. Such turning movements occur when passing curves.

The self-aligning bearings however permit the connecting rods to turn about their own longitudinal axes. This last mentioned capacity of turning is however entirely undesirable and causes increased wear in the bearings. The arrangement according to this invention has thus for its purpose to obviate this inconvenience and is characterized thereby that the connecting rod heads adjacent to each other on the same pin are in direct supporting engagement or support each other through intermediate members at portions of their peripheries located at the ends of a diameter substantially perpendicular to the longitudinal axes of the connecting rods but are free of engagement from each other along the remainder of their periphery, the arrangement having for its purpose to prevent turning of the connecting rods about their longitudinal axes but to permit their turning about axes perpendicular to their longitudinal axes.

Figure 1:
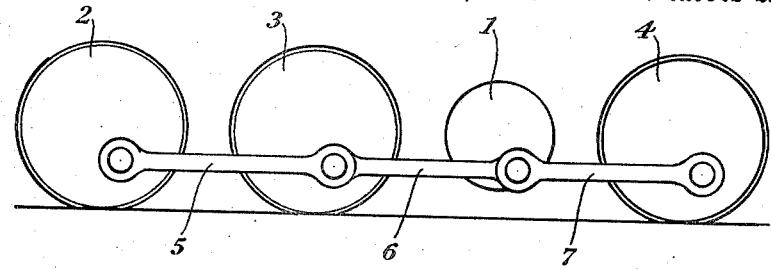
Figure 2:
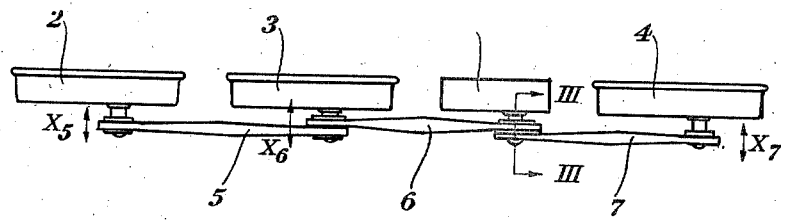
Figures 6, 7:
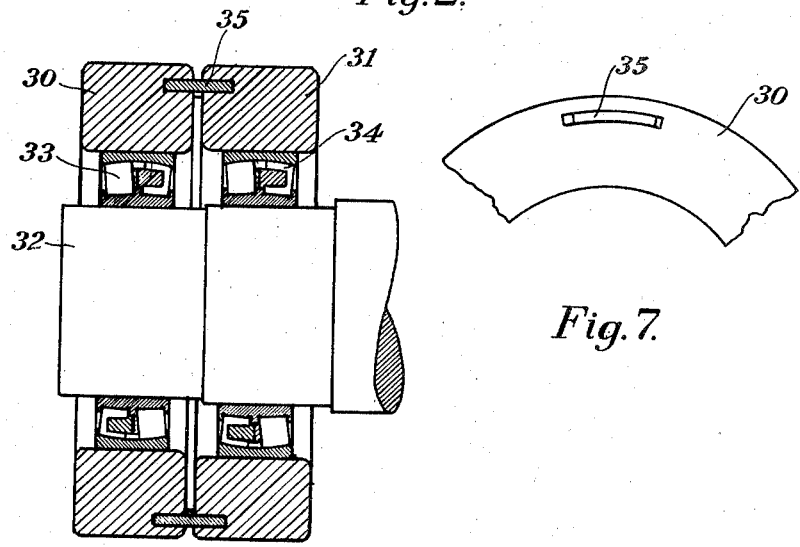

The invention is illustrated further in connection with the annexed drawings, in which Figs. 1 and 2 show a side view and a top view respectively of the wheel set with connecting rods for a locomotive, Fig. 3 is a section on a larger scale along the line III—III in Fig. 2, Fig. 4 is a detail of Fig. 3, Fig. 5 is a section along the line V—V in Fig. 3, Fig. 6 is an axial section through another embodiment, and Fig. 7 shows a detail of the same.

Figs. 1 and 2 show the wheel set of an electric locomotive, the driving motor of which drives a crank wheel or blind wheel 1 which is mounted in line with the driven wheels 2, 3, 4 of the locomotive. The crank wheel 1 and the wheels 2, 3 and 4 are each provided with a crank pin for transmitting power from the crank wheel to the other wheels. The crank wheel 1 is connected to the wheel 3 by means of a connecting rod 6 and with the rear wheel 4 by means of the connecting rod 7. The wheel 3 is connected with the front wheel 2 by means of a connecting rod 5.

The mounting of the connecting rods 6, 7 on the crank pin of the crank wheel 1 is shown in detail in Fig. 3. The crank pin has three seats 8, 9, 10 of stepwise decreasing diameter, and its thickest part 8 is rigidly pressed into the crank wheel 1. The part 9 carries with the aid of a sleeve 11 the inner ring 12 of a double row spherical roller bearing, the outer ring 15 of which carries the head of the connecting rod 6. In a similar manner the crank pin part 10 carries the head of the connecting rod 7 through the intermediary of a double row spherical roller bearing 16.

In order to prevent the intrusion of foreign particles into the bearings and the escape of lubricant from the same, a cover 17 is provided on the outside of the head of the connecting rod 7, and further the space between the two connecting rod heads is closed by a sealing ring 18 fixed on to the head of the connecting rod 6, the said sealing ring being in sealing cooperation with the head of the connecting rod 7. Another sealing plate 19 is fixed inside the head of the connecting rod 6 and sealing against the side face of the head of the connecting rod 6 and the crank wheel 1 is sealed by ribs 20 and sealing disc 21 fixed on the pin which together form a labyrinth seal.

As already mentioned, the invention has for its purpose to prevent or limit the turning of the connecting rods about their own axes, i. e. in directions shown by the arrows $a_7$, $a_6$ in Fig. 3. For this purpose the sealing ring 18 (Fig. 3 and Fig. 4) at two diametrically opposite points is formed with lugs 22, 23, which engage around the outer edge of the connecting rod 7. Each lug is provided with an insertion 24 of rubber, Bakelite, bearing metal or other suitable material. The substantially cylindrical surface 25 of the said insertion bears against or is adjacent to periphery of the head of the connecting rod 7, and one surface 26 is in engagement with one end surface of the connecting rod head. In order to prevent edge load on the surface 26 the said surface is slightly cambered, as shown in Fig. 5. The two surfaces 26 limit the turning of the connecting rod heads in opposite directions, and the cylindrical surfaces 25 limit the parallel turning of the connecting rod heads in the same direction.

At the crank pin of the wheel 3 there is a similar stabilizing arrangement acting between the heads of the connecting rods 5, 6 mounted beside one another. By this means all the connecting rods are maintained with their central planes substantially vertically directed, without eliminating their capacity of turning horizontally in the directions indicated by the arrows $x_5$, $x_6$ and $x_7$ (Fig. 2).

Figs. 6 and 7 show a simpler embodiment which is specially suitable in cases where the connecting rod heads are of the same size and the stresses acting on the connecting rods relatively small. Two connecting rod heads 30, 31 are mounted on a pin 32 by means of self-aligning spherical roller bearings 33, 34. In order to stabilize the connecting rods, two arched discs 35 are inserted in grooves between the adjacent side surfaces of the two connecting rod heads. The play between the discs 35 and the grooves is relatively small but still such as to permit a mutual movement between the discs 35 and the respective connecting rod head. The end surfaces of the discs 35 are somewhat convexedly curved in the manner of the surface 26 of the insertion 24 (Fig. 5).

The term "connecting rod" as used in the specification and claims is generic and is intended to cover all kinds of rods connecting a pair of movable parts. The term therefor includes among other things the parts of locomotives commonly designated as coupling rods or side rods.

The invention is not limited to the embodiments shown on the drawings but other modifications can be made in the design of the members. Furthermore the invention can be applied to steam driven locomotives and is generally usable in all arrangements having two or more connecting rod heads mounted on the same pin or journal.

Having thus described my invention, I claim and desire to secure by Letters Patent the following:

1. In an arrangement in connecting rods, the combination of connecting rod heads mounted on self-aligning bearings on the same crank pin, supporting means acting between adjacent heads at the ends of a diameter substantially perpendicular to the longitudinal axes of the connecting rods, so as to prevent turning movements of the connecting rods about their longitudinal axes, the connecting rod heads being free of engagement with each other along the remaining part of their peripheries, so as to allow turning movements of the connecting rods about axes perpendicular to their longitudinal axes.

2. In an arrangement in connecting rods, the combination of connecting rod heads mounted on self-aligning antifriction bearings on the same pin, supporting means acting between adjacent heads at the ends of a diameter substantially perpendicular to the longitudinal axes of the connecting rods, so as to prevent turning movements of the connecting rods about their longitudinal axes, the connecting rod heads being free of engagement with each other along the main part of their peripheries, so as to allow turning movements of the connecting rods about axes perpendicular to their longitudinal axes.

3. In an arrangement in connecting rods the combination of two connecting rod heads mounted on the same crank pin by means of self-aligning bearings, the connecting rod heads being in engagement at the ends of a diameter substantially perpendicular to the longitudinal axes of the connecting rods so as to prevent turning of the connecting rods about their longitudinal axes, the remaining portions of the peripheries of the connecting rod heads being out of engagement with each other so as to allow turning movements of the connecting rods about axes perpendicular to the longitudinal axes of the connecting rods.

4. In an arrangement in connecting rods on a locomotive, the combination of two connecting rod heads mounted on the same pin by means of self-aligning bearings and being out of engagement with each other, supporting members mounted on one of the connecting rod heads and being in supporting engagement with the other connecting rod head, said supporting members being situated at the ends of a diameter substantially perpendicular to longitudinal axis of the connecting rod.

5. Arrangement according to claim 1, in which the supporting means is in engagement with both the end surface and the peripheral surface of the connecting rod head.

6. In an arrangement in connecting rods on a locomotive, the combination of two connecting rod heads mounted on the same pin by means of self-aligning antifriction bearings, a sealing ring mounted on one of the heads, two supporting lugs formed on said ring at positions at the ends of a diameter substantially perpendicular to the longitudinal axes of the connecting rods, said lugs being in supporting engagement with the other connecting rod head so as to prevent turning of the connecting rods about their longitudinal axes.

7. Arrangement according to claim 6, in which the engaging surfaces are formed on members of bearing metal, or the like, attached to the supporting lugs.

8. In an arrangement in connecting rods, the combination of two connecting rod heads mounted on the same pin by means of self-aligning bearings there being opposed recesses in the adjacent end faces of the heads at the ends of a diameter perpendicular to the longitudinal axes of the connecting rods, supporting members resting in the said recesses but movable in relation to the walls thereof.

9. Arrangement according to claim 4 in which the engaging surfaces of the supporting members are crowned.

ALLAN OTTO GEORG PALMGREN.